United States Patent
Christiansen

(10) Patent No.: US 6,251,533 B1
(45) Date of Patent: Jun. 26, 2001

(54) CERAMIC LAMINATE MATERIAL

(75) Inventor: Niels Christiansen, Gentofte (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 09/404,784

(22) Filed: Sep. 24, 1999

Related U.S. Application Data
(60) Provisional application No. 06/103,327, filed on Oct. 7, 1998.

(51) Int. Cl.⁷ .............................. B32B 9/00; B32B 19/00
(52) U.S. Cl. .................... 428/701; 428/700; 428/701; 428/702; 501/152
(58) Field of Search ................................. 428/700, 701, 428/702; 501/152

(56) References Cited

U.S. PATENT DOCUMENTS 5,580,497 * 12/1996 Balachandran et al. ............. 252/519
6,150,290 * 11/2000 Christiansen et al. ................ 501/152

\* cited by examiner

*Primary Examiner*—Deborah Jones
*Assistant Examiner*—Lymarie Miranda
(74) *Attorney, Agent, or Firm*—Ostrolenk, Faber, Gerb & Soffen, LLP

(57) ABSTRACT

Ceramic laminate material comprising at least one dense layer of a perovskite material and at least one layer of a dense non-perovskite material and/or at least one layer of a dense superstructural perovskite material.

6 Claims, No Drawings

CERAMIC LAMINATE MATERIAL

This application claims the benefit of U.S. Provisional application Ser. No. 60/103,327 filed Oct. 7, 1998.

BACKGROUND OF THE INVENTION

1. Field of the Invention

The present invention relates to a ceramic laminate material or compositional graded ceramic for use in the production of ion and/or electron conducting ceramic products.

2. Description of the Related Art

Perovskite ceramic material in oxygen separation membranes, have the general formula:

$$A_xA'_{x'}A''_{x''}B_yB'_{y'}B''_{y''}O_{3-\delta'}$$

wherein x+x'+x''=1, and y+y'+y''=1, and

δ is a number, which renders the composition charge neutral.

Those materials are known from U.S. Pat. No. 5,240,473.

Dense ceramic membranes comprising a non-perovskite material represented by the formula:

$$(Sr_{1-y}M_y)_\alpha(Fe_{1-x}Co_x)_{\alpha+\beta}O_\delta$$

having electron conductivity and oxygen ion conductivity are known from U.S. Pat. No. 5,580,497.

High oxygen ion conductivity of ceramic materials comprising a superstructural form of the cubic perovskite structure, with the general chemical formula:

$$A_xA'_{x'}B_yB'_{y'}O_{2.5}$$

has been reported in the scientific literature.

It has been observed that perovskite materials with high oxygen conductivity exhibit poor structural stability and high thermal expansion at low oxygen partial pressures leading to limitations when these materials are used in separation of oxygen. In practice a compromise between high oxygen conductivity or high stability must be accepted (cf. "Dimensional Instability of Doped Lanthanum Chromites in an Oxygen Pressure Gradient", P. V. Hendriksen, J. D. Carter and M. Mogensen, in Proceedings of the fourth international Symposium on Solid Oxide Fuel Cells, Ed. by M. Dokiya, O. Yamamoto, H. Tagawa and S. C. Singhal, The Electrochemical Society Proc. Vol. 95-1, (1995)934; "Dimensional Instability and effect chemistry of doped lanthanum chromites", P. H. Larsen, P. V. Hendriksen and M. Mogensen, Journal of Thermal Analysis, Vol. 49, (1997), 1263; and "Lattice Expansion induced strains in solid oxide fuel cell stacks and their significance for stack integrity", P. V. Hendriksen and O. Joergensen, in "High Temperature Electrochemistry: Ceramics and Metals". Proceedings of the 17th Risoe International Symposium on Materials Science (1996), 263).

SUMMARY OF THE INVENTION

Pursuant to these observations and findings this invention provides a dense ceramic laminate material comprising at least one dense layer of a perovskite material and at least one layer of a dense non-perovskite material and/or at least one layer of a dense superstructural perovskite material.

DETAILED DESCRIPTION OF THE PREFERRED EMBODIMENTS

The perovskite material for use in the invention is represented by the chemical formula:

$$A_xA'_{x'}A''_{x''}B_yB'_{y'}B''_{y''}O_{3-\delta}$$

wherein:

x+x'+x''≦1 and/or y+y'+y''≦1.

The non-perovskite material is represented by the chemical formula:

$$(A_xA'_{x'}A''_{x''})_a(B_yB'_{y'}B''_{y''})_bO_{3-\delta}$$

wherein x+x'+x''≦1 and/or y+y'+y''≦1 and a is a number in a range from 1 to 4 b is a number in a range from 1–10 and

δ is a number, which renders the composition charge neutral.

The superstructural perovskite material has a Brownmillerite structure with the general chemical formula:

$$A_xA'_{x'}A_xB_yB'_{y'}B''_{y''}O_{2.5}$$

wherein x+x'+x''≦1 and/or y+y'+y''≦1 or with pyroclore structure having the general chemical formula:

$$A_xA'_{x'}A''_{x''}B_yB'_{y'}B''_{y''}O_{3.5}$$

A, A' and A'' each is one or more metals selected from the group of lanthanide metals and/or a divalent metal, preferably from the group IIA of the Periodic Table.

B, B' and B'' each is a metal selected from the group of transition metals, group IIIA and noble metals of group VIII of the Periodic Table.

Each layer in the ceramic laminate is selected in such a way that an improved structural and chemical stability is obtained in comparison with each single layer when exposed to an oxygen rich gas on one side and an oxygen poor gas on the other side. Brownmillerite material contains a large number of ordered intrinsic oxygen vacancies, which become disordered above a certain transition temperature depending on the chemical composition, leading ultimately to intrinsic fast oxygen ion conductivity. Correspondingly, pyroclore materials can be substituted on the A site and on the B site in the chemical formula leading to intrinsic fast oxygen ion conductivity.

Contrary to the classical oxygen ion conducting perovskites, Brownmillerite material can be classified as a superstructural cubic perovskite with a fixed high concentration of oxygen ion vacancies. Therefore, the Brownmillerite material exhibits a higher dimensional and mechanical stability than the perovskite materials during reduction at low partial pressures.

In accordance with specific embodiments of the invention a thin dense brownmillerite layer with a thickness from 0.5 μm to 5000 μm is coated on a thin dense perovskite layer with a thickness of 0.5 μm to 5000 μm and placed on the oxygen-poor side of the membrane to protect the perovskite layer from the reducing environment. Both layers possess a high oxygen ion conductivity or a high mixed electronic and oxygen ionic conductivity.

In another configuration in accordance with the present invention, the dense Brownmillerite is coated on the dense perovskite on the oxygen rich side of the membrane to ensure a high flux of oxygen ions through the membrane when the perovskite is selected to possess maximal dimensional and mechanical stability.

In accordance with specific embodiments of the invention, the membrane may consist of Brownmillerite and/or pyroclore, and/or non-perovskite coated or laminated layers on one or both sides of a perovskite layer or multi-layers of different composition belonging to the types of perovskites, Brownmillerite, pyroclores or non-perovskites mentioned above.

EXAMPLE

Using drip pyrolysis procedure a ceramic powder was produced. Aqueous solutions of metal nitrates, acetates or carbonates were mixed in the required proportions according to the proposed chemical formula. Then combustion fuel such a glucose or glycine was added to the above solution in order to get fuel-rich mixtures. The stock solutions as prepared were drip pyrolysed in a rotary kiln. From XRD analysis the powders were found to have a perovskite structure.

The material has the chemical formula:

$(La_{0.7}Sr_{0.3})_{0.9}Fe_{0.8}Co_{0.2}O_{3-\delta}$ or $(La_{0.7}Sr_{0.3})_{0.9}Ga_{0.8}Mn_{0.2}O_{3-\delta}$ and may be used for applications such as: SOFC cathode, mixed electronic/ionic conductive membranes, oxidation catalyst and sensor. The A-site deficient perovskite compound has an improved chemical stability towards other ceramic materials such as yttria stabilised zirconia in comparison with perovskite with A/B=1.

After mixing the fine-grained perovskite powder with water and a suitable binder such as methylcellulose, the mixture may be shaped as tubes by extrusion followed by drying and sintering based on well known ceramic production methods. The sintered tubes may be coated on the inside or on the outside and on both sides by a ceramic slurry consisting of a ceramic powder with Brownmillerite structure synthesised by the technique analogously to the above mentioned.

The Brownmillerite material employed in this example has the chemical formula:

$Sr_2Fe_{1.6}Co_{0.4}O_5$ or $Sr_2Ga_{1.6}Mn_{0.4}O_5.$

After sintering of the Brownmillerite coated perovskite tube, a dense mixed electronic and oxygen ionic conducting tubular multilayer membrane is obtained.

As many related structures may exist between the perovskites and the Brownmillerite structures depending on the sintering conditions, a functionally graded membrane, which may be used for oxygen separation and membrane reactors, is obtained.

Although the present invention has been described in relation to particular embodiments thereof, many other variations and modifications and other uses will become apparent to those skilled in the art. Therefore, the present invention is to be limited not by the specific disclosure herein, but only by the appended claims.

What is claimed is:

1. Ceramic laminate material comprising at least one dense layer of a perovskite material represented by the chemical formula:

$A_xA'_{x'}A''_{x''}B_yB'_{y'}B''_{y''}O_{3-\delta}$ wherein $x+x'+x'' \leq 1$ and/or $y+y'+y'' \leq 1$ and at least one other layer of a dense non-perovskite material and/or at least one layer of a dense superstructural perovskite material.

2. Material according to claim 1, wherein said other layers are all of a non-perovskite material represented by the chemical formula:

$(A_xA'_{x'}A''_{x''})_a(B_yB'_{y'}B''_{y''})_bO_{3-\delta}$ wherein $x+x'+x'' \leq 1$ and/or $y+y'+y'' \leq 1$ and a is a number in a range from 1 to 4 b is a number in a range from 1–10 and $\delta$ is a number, which renders the composition charge neutral.

3. Material according to claim 1, wherein said other layers are all of a superstructural perovskite material represented by the Brownmillerite structure having the general chemical formula:

$A_xA'_{x'}A''_{x''}B_yB'_{y'}B''_{y''}O_{2.5}$ where $x+x'+x'' \leq 1$ and/or $y+y'+y'' \leq 1$ or by the pyroclore structure having the general chemical formula:

$A_xA'_{x'}A''_{x''}B_yB'_{y'}B''_{y''}O_{3.5}.$

4. Material according to claim 1, wherein A, A' and A'' each is one or more metals selected from the group consisting of lanthanide metals and/or a divalent metal.

5. Material according to claim 1, wherein B, B' and B'' each is a metal selected from the group consisting of transition metals, group IIIA and noble metals of group VIII of the Periodic Table.

6. Material according to claim 4, wherein said divalent metal is selected from group IIA of the Periodic Table.

* * * * *